Aug. 1, 1933.  A. J. LEWIS ET AL  1,920,266
ASSEMBLING MACHINE
Filed Jan. 18, 1930  9 Sheets-Sheet 1

INVENTORS
Arthur J. Lewis, John W. Richardson
Charles J. Spill and Harry B. Haven,
Fraser, Myers & Manley.
ATTORNEYS.

Fig. 3.

Aug. 1, 1933.  A. J. LEWIS ET AL  1,920,266
ASSEMBLING MACHINE
Filed Jan. 18, 1930  9 Sheets-Sheet 4

INVENTORS:
Arthur J. Lewis, John W. Richardson,
Charles J. Spill and Harry B. Haven,
By Attorneys,
Fraser, Myers & Manley Aug. 1, 1933.  A. J. LEWIS ET AL  1,920,266
ASSEMBLING MACHINE
Filed Jan. 18, 1930   9 Sheets-Sheet 5

INVENTORS:
Arthur J. Lewis, John W. Richardson
Charles J. Spill and Harry B. Havens
Draver, Myers & Manley
ATTORNEYS.

Aug. 1, 1933.　　A. J. LEWIS ET AL　　1,920,266
ASSEMBLING MACHINE
Filed Jan. 18, 1930　　9 Sheets-Sheet 8

INVENTORS:
Arthur J. Lewis, John W. Richardson,
Charles J. Spill and Harry B. Haven,
By Attorneys,
Fraser, Myers & Manley.

Aug. 1, 1933. A. J. LEWIS ET AL 1,920,266
ASSEMBLING MACHINE
Filed Jan. 18, 1930 9 Sheets-Sheet 9

INVENTORS:
Arthur J. Lewis, John W. Richardson,
Charles J. Spill and Harry B. Haven,
Fraser, Myers & Manley.
ATTORNEYS.

Patented Aug. 1, 1933

1,920,266

UNITED STATES PATENT OFFICE 1,920,266

ASSEMBLING MACHINE

Arthur J. Lewis and John W. Richardson, Stratford, Conn., Charles J. Spill, Garden City, N. Y., and Harry B. Haven, Milford, Conn., assignors to A. Schrader's Son, Inc., Brooklyn, N. Y., a Corporation of New York Application January 18, 1930. Serial No. 421,772

30 Claims. (Cl. 29—33.)

This invention relates to a machine for assembling a screw-threaded plug which swivelly carries a valve seat member upon a valve pin which has mounted thereon, a valve plunger or check, a valve spring, and a supporting element for said spring, the valve plunger, valve spring, and spring support being non-separably mounted upon the valve pin.

In the manufacture of tire valve insides of the type to which the present invention is directed as heretofore carried out, the various valve parts were made on separate machines and were subsequently assembled into units and then into the completed valve insides through the intervention of both human and mechanical agencies. Although these operations were conducted with a high degree of efficiency it was recognized that the handling of the small elements by the human fingers was both tedious and trying on the operators, and also proved to be the largest item in the manufacturing cost.

To increase the manufacturing efficiency and to overcome the objections before noted, we have provided a machine in which the assembling of the two major units of the valve inside before mentioned is carried out automatically in a continuous operation.

According to the present invention we provide a machine having a plurality of instrumentalities by means of which a valve pin having a valve plunger, a valve spring, and a spring support non-separably mounted thereon is fed to an intermittently moving conveyor having a plurality of recesses to receive said pins, which in turn are successively conducted to a plurality of stations whereat the following operations are automatically performed with respect to or upon the fed valve pin: the valve pin is positively seated in a recess; a unit of the screw plug and valve seat is applied upon the pin above the valve plunger; the end of the pin is swaged or upset to hold the plug and valve seat unit in assembled relation on the pin, and the elements as thus assembled are ejected from the machine. The cooperative relation and arrangement of the various instrumentalities is such that the beforementioned operations are carried out in succession continuously with great dispatch. The invention, it will be appreciated, also includes numerous sub-combinations and features of novelty, all of which will be apparent from the detailed description which follows.

An operative embodiment of our invention is shown in the machine illustrated in the accompanying drawings wherein

Fig. 4 is a side elevation of the valve pin feeding mechanism.

Fig. 5 is a top plan view of the mechanism shown in Fig. 4.

Fig. 6 is a fractional end elevation of the mechanism shown in Fig. 4.

Fig. 6$^a$ is an end elevation showing the portion missing from Fig. 6.

Fig. 7 is an enlarged top plan partly broken away of the raceway constituting a part of the feed mechanism shown in Fig. 4.

Figures 1, 2:
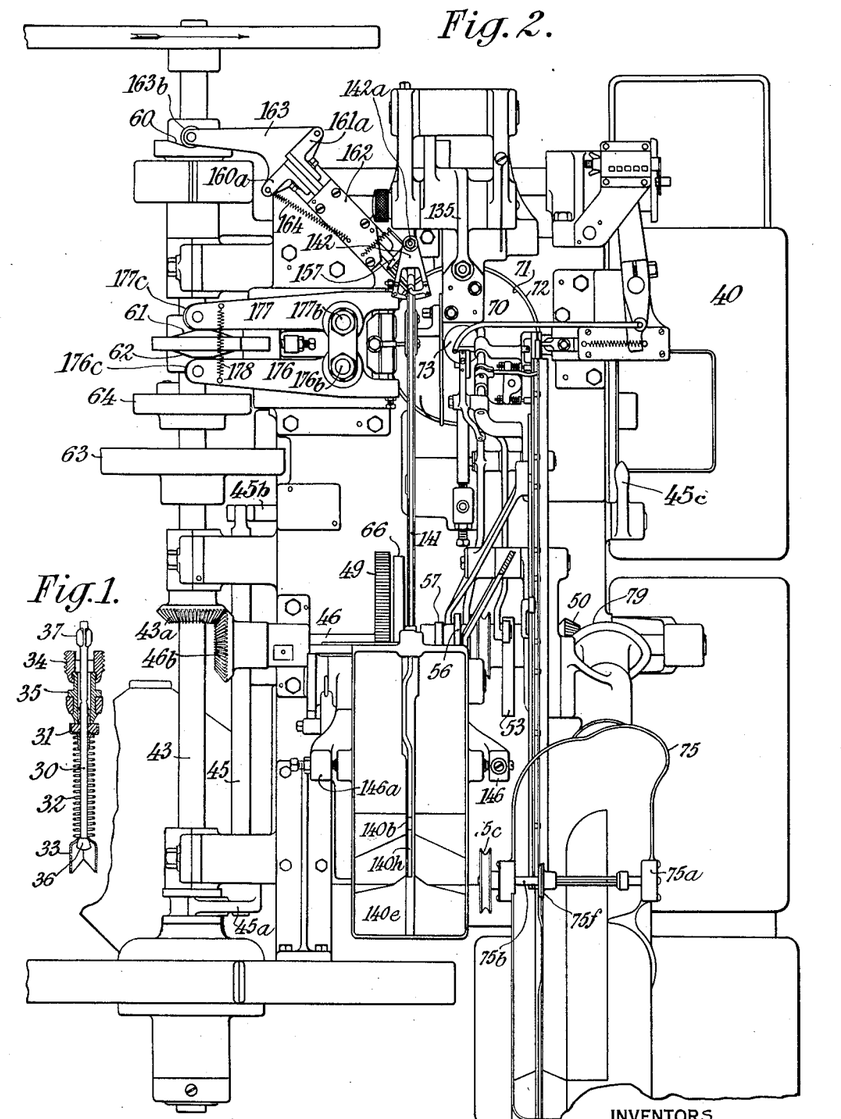
Figure 1 is a longitudinal section of a tire valve inside, the same being the final product turned out by the machine of the present invention.
Fig. 2 is a top plan view of the machine forming the subject matter of the present invention.
Figure 3:
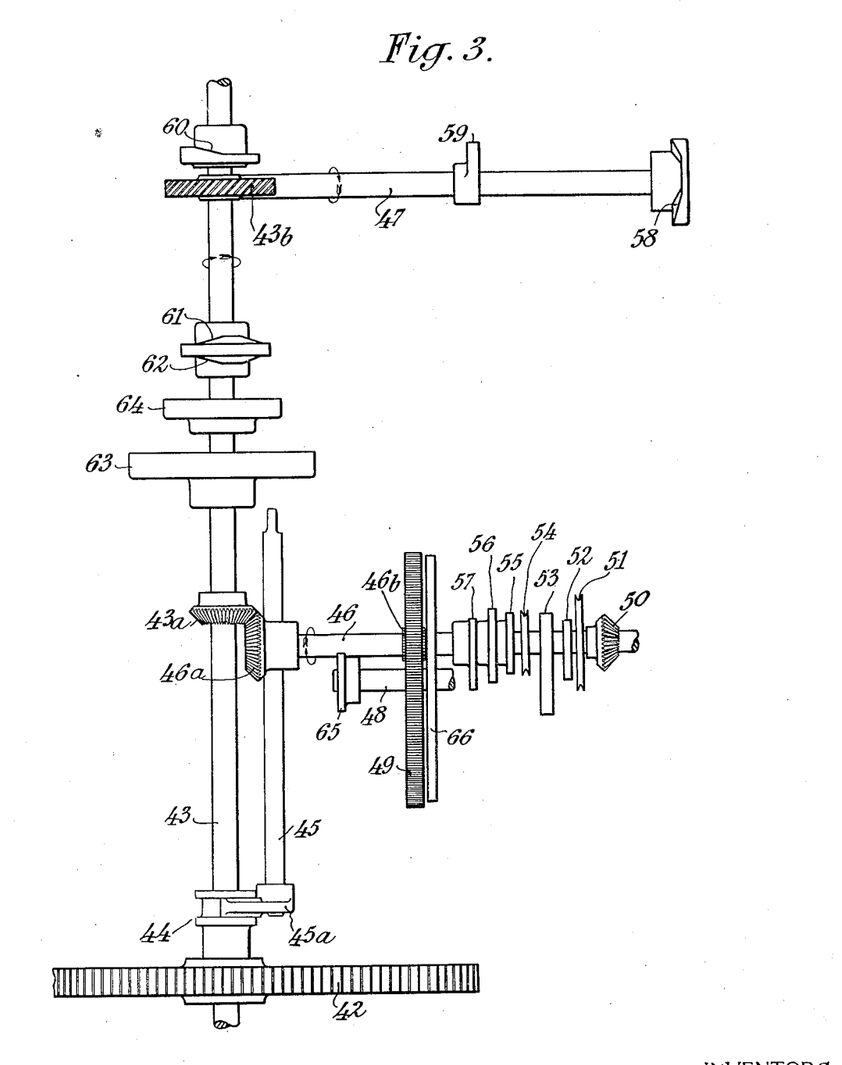
Fig. 3 is a top plan of the arrangements by which the power is applied to the various operating mechanisms of the machine.

The machine of the present invention is adapted to feed the following units: (a) A valve pin 30 having a valve plunger 31, a valve spring 32, and a spring support 33 non-separably mounted upon said pin 31, and (b) a screw-threaded plug 34 which swivelly carries the valve seat member 35, the units (a) and (b) being non-removably carried upon the pin 31 through the medium of the swaged enlargements 36 and 37 at the opposite ends of said pin. The assembled valve inside is shown in Figure 1 of the drawings.

In order that the manner of operating the various parts of the machine which will be hereafter described in detail may be clear, the arrangements by which the power is applied to the various mechanisms will be first briefly described.

As shown in the various figures the parts are either mounted upon or supported by a suitable table 40 in suitable bearings on which are supported a shaft 43 having mounted for free rotation thereon a gear 42 adapted to be driven by any source of motive power, and adapted to impart rotation to the shaft 43 through the medium of a clutch 44 which is controllable by an operating handle 45c through lever 45b connecting rod 45 and clutch yoke 45a. A shaft 46 is driven from the shaft 43 through the medium of miter gears 43a and 46a mounted on said respective shafts. A shaft 47 is driven from shaft 43 through the medium of a spiral gear 43b mounted on the shaft 43, and a spiral gear (not shown) mounted upon the shaft 47 in cooperative engagement with the gear 43b. A stub shaft 48 is adapted to be driven from the shaft 46 through the medium of a pinion 46b in mesh with a gear 49 mounted upon the shaft 48.

Mounted on the shafts 43, 46, 47, and 48 are numerous cams and pulleys through the medium of which the various operating mechanisms of the machine are controlled. The functions of these cams and pulleys will now be briefly described.

Referring first to shaft 46, there is mounted thereon a bevel gear 50 for driving the pin feeding hopper; a pulley 51 over which is trained a helical coiled spring belt which constitutes the carrying means for the pins down the raceway of the pin feeding mechanism; a cam 52 which controls the plunger pin interrupter; a cam 53 which controls the plunger pin feeding finger at the interrupter station; a pulley 54 over which is trained a belt for driving a kick-off means in the plunger pin feed hopper; a cam 55 which operates means for lifting the plunger feeding finger; a cam 56 which controls the lifting of the feeding slide from the plunger pin raceway; and a cam 57 which controls the oscillation of the feeding slide for the plunger pin raceway. On shaft 47 cam 58 controls the movements of a shutter and a pusher rod at the plunger pin feeding station, and a cam 59 which controls the movement of an element for seating the valve pin in the dial recess. On shaft 43 cam 60 controls a centering device at the swivel plug feeding station; cams 61 and 62 control a pair of swaging dies for enlarging the top of the plunger pin; cam 63 controls the intermittent feed of the dial; and cam 64 controls means for locking the dial during the interval that an operation is taking place at each of the operative stations of the dial. On shaft 48 cam 65 controls a shutter upon the swivel plug hopper, and heart cam 66 controls the oscillation of the swivel plug hopper.

The various subordinate and correlating mechanisms of the machine, together with their operating means, will now be described more in detail.

Figures 20, 22:
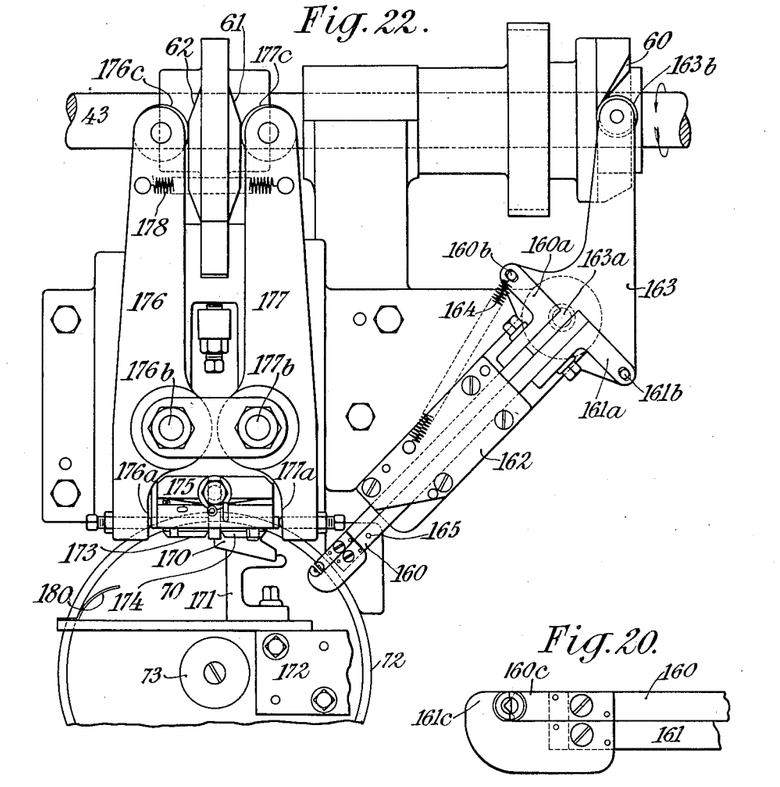
Figs. 20 and 21 are a top plan view and a side elevation respectively of centering means for the valve plugs and seat members fed from the interrupter means shown in Figs. 18 and 19 to the dial.
Fig. 22 is a top plan view of the centering means shown in Fig. 20, together with its operating mechanism, and also the means for swaging the pins and its operating mechanism.

*The dial conveyor and operation thereof.*—For intermittently presenting the fed valve pins or plungers to the respective stations whereat the various operations are performed thereon or with respect thereto, there is provided a dial 70 which is formed about its periphery with vertically disposed radial recesses 71, and surrounding said dial to provide a closure for said radial recesses is a guard ring 72, all of which is best shown in Figs. 2 and 22. The dial is intermittently rotated upon a vertical shaft 73 by operative means controlled by the cams 63 and 64, the details of said operating means being not shown herein as the same are described and claimed in detail in a co-pending application, Serial No. 383,398, filed August 3, 1929, and of which application Arthur J. Lewis, John W. Richardson, and Charles J. Spill, three of the co-inventors of the present machine are the joint inventors.

Figures 4, 5, 6, 6A, 7:
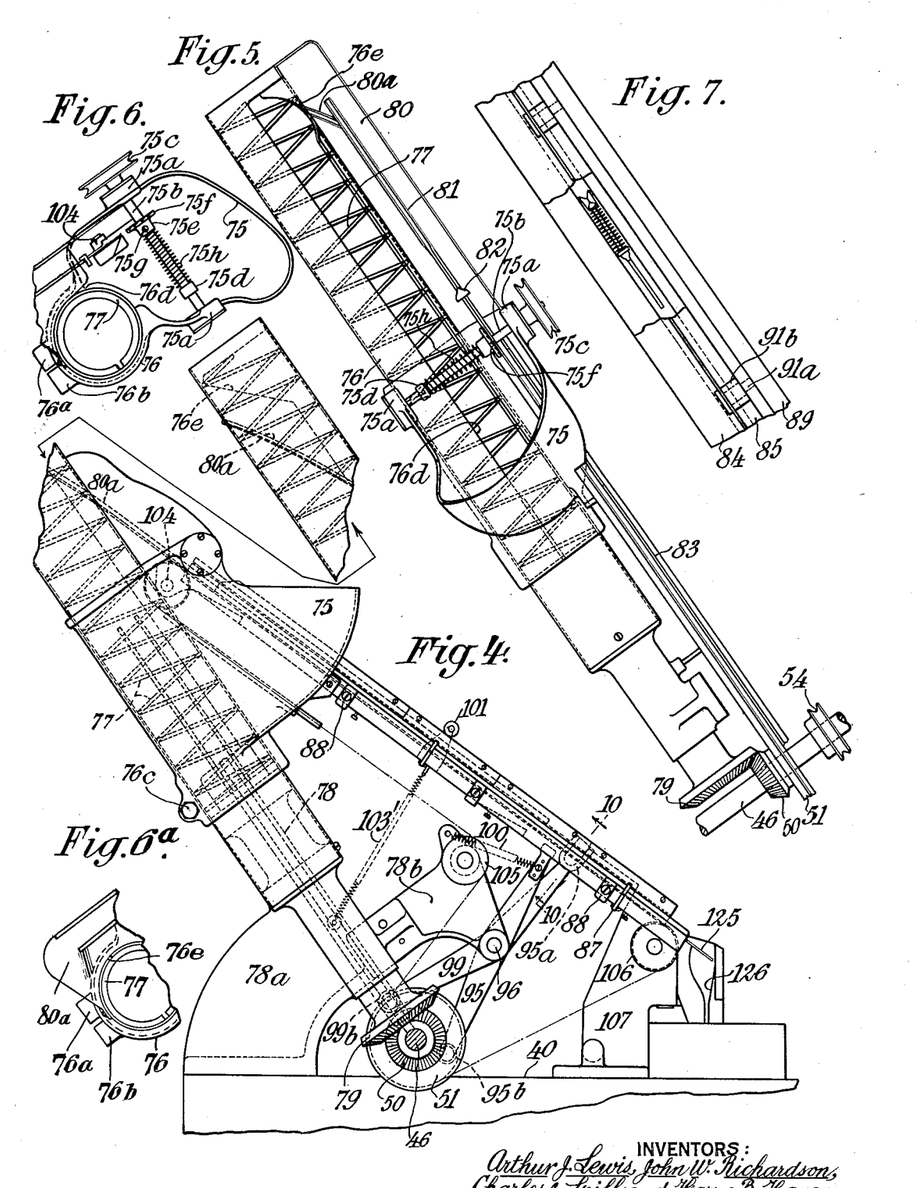

*Valve pin feeding means (Figs. 4 to 10).*—The valve pins which are to be operated upon may be fed to the recesses 71 in the dial 70 in any preferred manner. In view, however, of the mounting of the coiled spring 32 upon the pin 30, and the difficulty of properly feeding such spring-mounted pins, we have designed a novel form of feed hopper therefor which as herein shown comprises a pin receptacle or reservoir 75 of somewhat hemispherical contour, and extending through said receptacle and upwardly therefrom is a substantially cylindrical casing 76 which as herein shown is formed of two longitudinal sections 76a and 76b suitably bolted together as shown at 76c, said casing being not a complete cylinder since it is longitudinally open as shown at 76d. Mounted within the cylinder 76 is a helix 77 which closely fits the interior of said casing, said helix extending the full length of the cylinder through the receptacle 75, said helix being relatively narrow to provide a hollow core throughout its length as best shown in Fig. 6. The helix 77 is mounted at the upper end of a shaft 78, the lower end of which carries a bevel gear 79 in mesh with the gear 50 on shaft 46, said shaft 78 being supported in a suitable bearing provided in a bracket member 78a mounted upon the table 40. The casing 76 and helix 77 are mounted in inclined relation to the horizontal so that as the helix is rotated it will pick up and progressively carry the valve pins from the receptacle 75 toward the top of the casing 76, whereat the casing is provided with an enlarged opening 76e through which the pins are discharged from the helix to the trough-like top 80a of a slide or chute 80.

Mounted on said slide 80 is a raceway 81 extending substantially parallel to the chute, the trough-like portion 80a leading from the upper end of the raceway 81 to the opening 76e in the casing. The raceway 81 is substantially semi-circular or trough-shaped in cross-section for a portion of its length, and for the remainder of its length is substantially circular in cross-section, or cylindrical in form so as to guide the valve pins longitudinally therethrough. On the cylindrical portion of the raceway just below the trough formation thereof, there is provided a deflector element 82 adapted to deflect back into the cylinder any pins which come down the chute 80 outside of the raceway 81.

Mounted transversely across the top of the receptacle 75 in suitable bearings 75a is a shaft 75b upon one end of which is mounted a pulley 75c adapted to accommodate a belt trained around pulley 54 on shaft 46. Upon shaft 75 intermediate its ends there is mounted a fixed bushing 75d and a movable bushing 75e, the latter being provided with a flanged end 75f, the face of which is radially notched or toothed. The bushing 75e is loosely mounted on the shaft 75b, and is longitudinally movable with respect thereto by having a set screw 75g seating in a spiral groove (not shown) on said shaft. The flanged bushing 75e is resiliently held at the forward end of its movement by a coiled spring 75h mounted upon the shaft 75b between the bushings 75d and 75e. In said position the flanged head 75f directly overlies the raceway 81, and as the shaft 75b is rotated said head 75f functions as a kick-off to prevent jamming of the valve pins in the raceway, and also as a vibrator for the raceway whereby the pins are assisted in their sliding movement downwardly in addition to the action of gravity thereon.

Figures 8, 12:
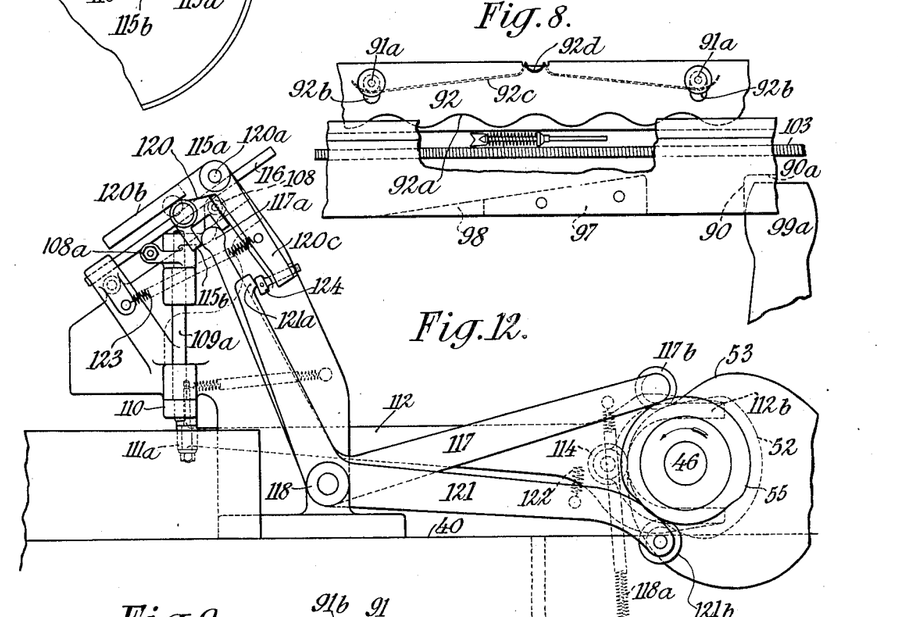
Fig. 8 is an enlarged side elevation partly broken away of the feed mechanism shown in Fig. 4.
Fig. 12 is a side elevation of the mechanism shown in Fig. 11.
Figures 9, 10:
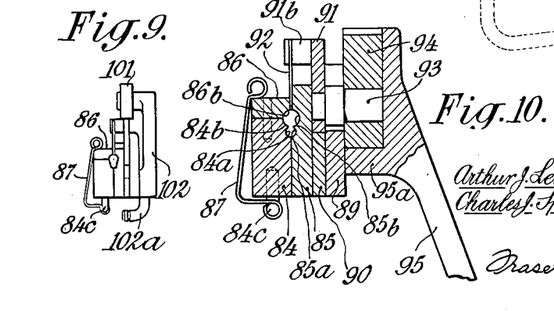
Fig. 9 is an end elevation of the raceway constituting part of the feed mechanism shown in Fig. 4, said elevation being that at the lower end of the raceway.
Fig. 10 is a transverse section of the raceway taken substantially along the plane of the line 10—10 of Fig. 4.
Figure 11:
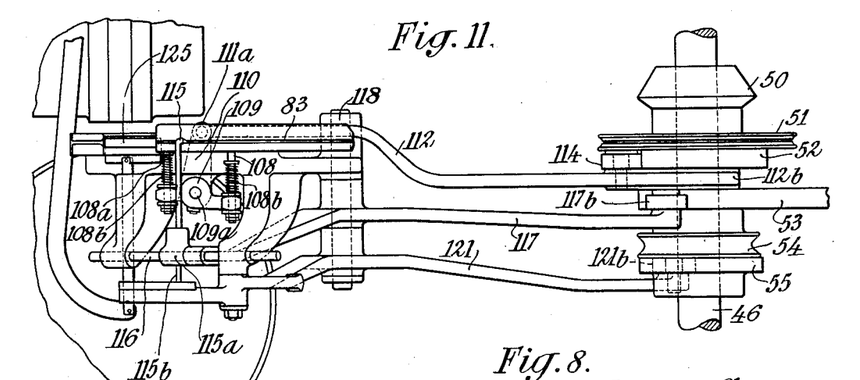
Fig. 11 is a top plan view of the pin feed interrupter mechanism at the lower end of the raceway, and of the means operating the same.

The raceway 81 communicates at its lower end with a supplemental raceway 83 disposed in alignment therewith and forming substantially a continuation thereof. As seen in Figs. 9 and 10 the raceway 83 comprises a pair of longitudinally extending members 84 and 85 disposed in abutting relation and provided in their adjacent faces with complemental grooves 84a and 85a, and above said complemental grooves with additional complemental grooves 84b and 85b, the member 84 having superposed upon it the bar or element 86 which is formed with a longitudinally extending groove 86b which cooperates with the grooves 84b and 85b to provide a substantially cylindrical channel. The grooves 84a and 85a in their complemental relation also provide a substantially cylindrical channel. To hold the element 86 in superposed relation upon the member 84 a plurality of spring clips 87 are provided, the lower ends of said clips engaging over pins 84c at the lower edge of the member 84, and the upper ends of said clips being inwardly bent and curled to engage over the top surface of the element 86. Secured to the members 84 and 85 by bolts 88 is a guide plate 89 which extends parallel to the member 85 and is spaced therefrom by a spacing plate 90 through which the bolts 88 also pass. The spacing plate 90 does not extend to the full width of the members 85 and 89, and, accordingly, provides a channel between said members in which channel is disposed and longitudinally movable a plate 91. Carried by said plate in parallel spaced relation thereto is a blade 92, the lower edge of which has a serpentine formation 92a which extends into a space provided between the adjacent faces of the members 85 and 86. For holding said blade in spaced relation to the plate 91 bolts 91a are provided and fitted with spacing elements 91b. To permit slight relative movement of the blade 92 transversely with respect to the plate 91, the bolts 91a engage in elongated slots 92b in the blade and are normally pressed against the top of said slots by tension springs 92c, the central portions of which are bowed and anchored over the plate as shown at 92d in Fig. 8.

For reciprocating the plate 91 and with it the blade 92 relatively to the raceway 83, the plate 91 is fitted with a pin 93 which carries at its outer end a block 94 which is straddled by the bifurcated end 95a of a lever 95 which is pivoted intermediate its ends upon a pin 96 carried by an extension 78b of bracket member 78a, the other end of said lever being provided with a roller 95b which is held in contact with the surface of cam 57. In the course of the reciprocating movement of the plate 91, that is, as said plate is moved rearwardly or upwardly with respect to the raceway 83, it is lifted in its slide way out of contact with the plunger pins or carrier element within said raceway so as not to interfere with the forward or downward movement of said carrier element or pins. The lifting of the plate 91 is accomplished through the medium of a wedge-shaped cam 97 carried by the member 85, which cam cooperates with a tapered slot 98 in the spacing plate 90, the latter having a recess 90a in which is fitted one end 99a of a lever 99 which is pivoted intermediate its ends upon the pin 96, and which carries at its opposite end a roller 99b which is held in contact with cam 56 by a tension spring 100. The timing of the movements of the levers 95 and 99 are such that when the blade 92 is moving forward or downwardly it is lowermost in its slot, and as it moves rearwardly it is uppermost in its slot. To insure movement of the blade down into its slot when it reaches the limit of its rearward movement and when spacing plate 90 is in the position with respect to the cam 97 as shown in Fig. 8, there is provided a roller 101 mounted upon a bracket 102 in sliding relation with the raceway 83, the lower end of said bracket having a spring anchorage 102a to which a tension spring 103' is connected, the opposite end of said spring being anchored to a point on the bracket 78a.

Disposed within the cylindrical recess formed by the surfaces 84a and 85a is a closely coiled helical spring 103, which spring is trained over a pulley 104 disposed within the receptacle 75 below the kick-off 75f, then over a pulley 105 supported in bracket 78b, then over the pulley 51 mounted on shaft 46, thence over a pulley 106 supported in a bracket 107 mounted upon the table 40. In the cylindrical recess provided by the surfaces 84b, 85b, and 86b, the plunger pins 30 having the plungers 31, springs 32 and spring supports 33 mounted thereon, are adapted to be fed from the raceway 81, the positive movement of said spring-fitted pins down the raceway 83 being accomplished by the joint action of the movement of the helical spring 103, and the intermittent engagement of the blade 92 with said pins.

As the pins supplied to the raceway 83 from the hopper 75 reach the lower end of said raceway they are intermittently and positively fed in timed relation to a secondary feeding means from which they are in turn fed in upright position to the recesses in the dial. The means for positively feeding the pins from the raceway to the secondary feeding means comprises an interrupter consisting of a pair of spaced pins 108 and 108a carried upon the opposite ends of a lever 109 which is rigidly mounted upon a pin 109a, the lower end of which is rigidly connected to a lever 110, the opposite end of which is pivotally connected to one end 111a of a lever 112 which is forked, as shown at 112b, and is provided at the bight of the fork with a roller 114 in engagement with the surface of cam 52. The pins 108 and 108a are disposed transversely to the raceway 83 and are alternately movable across said raceway through lateral openings therein to alternately arrest and release a pin from said raceway. To obviate the danger of doing injury to interrupter pins 108 and 108a should they upon moving transversely to the raceway strike or engage the valve pin, said interrupter pins are resiliently mounted upon the bracket 109 through the medium of encircling coil springs 108b.

Because of the spring mountings upon the valve pins there is a possibility of said fed pins sticking within the interrupter block when the lower interrupter pin 108 is moved to release the valve pin from said block. To insure positive movement of the valve pin there is provided a valve pin feed finger 115 which is reciprocable longitudinally of the raceway between the pins of the interrupter. Said feed finger is mounted to slide upon a guide rod 116, and sliding movement is imparted to said feed finger through the medium of bell crank lever 117 which is pivoted in a bearing 118 mounted on the table 40, one end 117a of said lever being rockably engaged in a bifurcated bearing 115b depending from the lower side of a member 115a to which the finger 115 is connected, and the opposite end of said bell crank lever being provided with a roller 117b which is held in contact with the surface of cam 53 by a tension spring 118a. For alternately moving the engaging end of finger 115 into gripping contact with a fed valve pin for positively moving the same down the raceway, there is provided a bell crank lever 120 which is pivoted at 120a, one arm 120b of said lever being adapted to engage the pin 115 to move it downwardly when the other arm 120c of said bell crank lever is engaged by the end 121a of a bell crank lever 121 which is pivoted at 118, as the opposite end of said bell crank lever 121 which carries the roller 121b rides over the high of cam 55. A tension spring 122 normally holds the roller 121b in contact with the surface of cam 55. For releasing the engaging contact of the arm 120b with the finger 115 a tension spring 123 is provided. For adjusting the degree of axial movement of the finger 115 about slide rod 116 there is provided a set screw 124 at the end of the arm 120c of the bell crank lever 120. It is to be understood that the engagement of the finger 115 with a pin in the raceway only takes place on the downward or forward movement of said finger in said raceway, it being understood that on its upward or rearward movement the finger is held out of engagement with the pin in the raceway by the bell crank lever 120 and spring 123.

Figure 13:
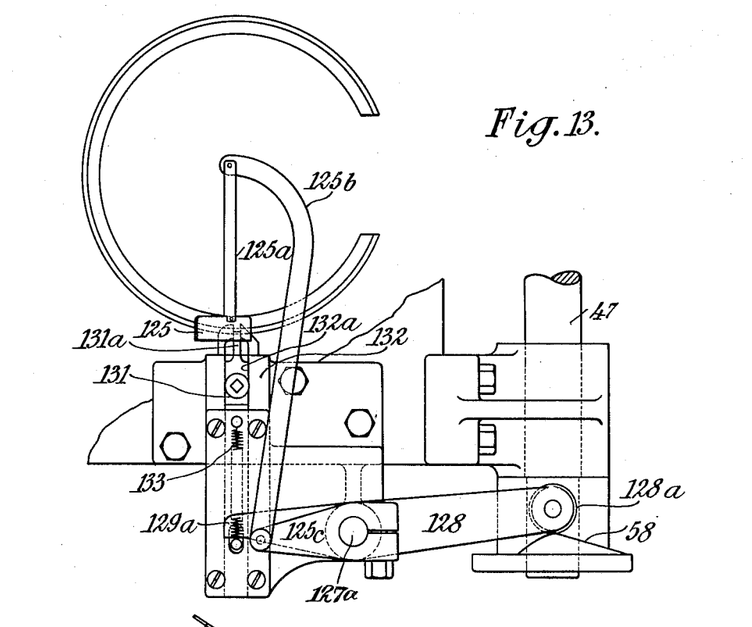
Fig. 13 is a top plan view of the means for feeding the pins to the recesses in the dial.
Figure 14:
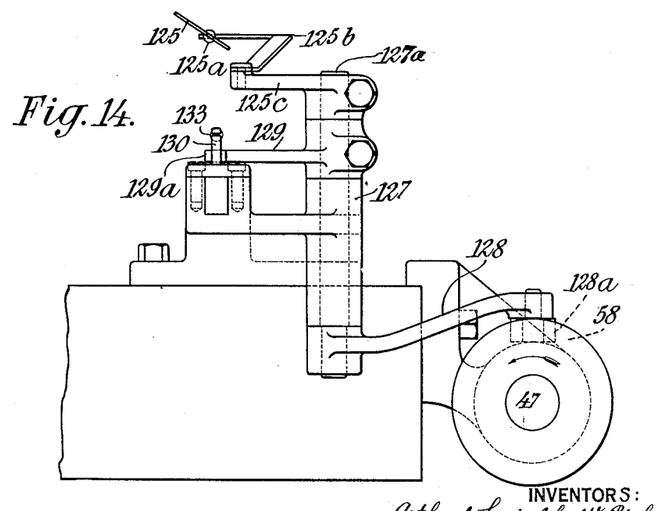
Fig. 14 is a side elevation of the mechanism shown in Fig. 13.

From the raceway 83 the finger 115 positively moves a fed pin upon a gate or shutter 125 disposed above a funnel-shaped chute 126 from which the valve pins are then dropped and pushed into the recesses of the rotatable dial. It will be understood that the fed pins coming down the raceway are not all in the same order, that is to say, some will be bare pin foremost, and others with the encircling spring foremost. The funnel-shaped chute 126, accordingly, serves to drop the valve pins so that they will all fall into the recess at the bottom of the chute in upright position, or bare pin uppermost. To drop a pin from the gate or shutter 125 into the chute 126, the gate is laterally movable through the medium of a link 125a rigidly secured to one end of second link 125b, the other end of said link 125b being rigidly secured to a lever 125c, the opposite end of which is mounted upon a pin 127a to be rotatable therewith. The pin 127a is mounted in an upright bearing 127 and has secured to its lower end one end of a lever 128 which carries at its opposite end a roller 128a in engagement with the surface of crown cam 58. Between the bearing 127 and lever 125c there is mounted upon the pin 127a for rotational movement therewith, a lever 129, the end 129a of which abuts against a vertical pin 130 carried by a slide block 131 at the forward end of which there is provided a projection 131a adapted to engage a pin after it is dropped from the chute 126 to move said pin radially inwardly into a recess 71 in the dial. The slide block 131 is guided in its movement by the walls 132a of a guide block 132. The slide block 131 is normally urged toward the dial by a tension spring 133, one end of said spring being anchored to the block 132 and the other end to the pin 130. Through the engagement of the end 129a with the pin 130 the spring 133 also functions to exert a rotative force upon the pin 127a, and in turn upon the lever 128 to hold the roller 128a in contact with the cam 58. It will be seen from an inspection of Figs. 13 and 14 that the movements of the gate or shutter 125, and of the push rod 131a are substantially simultaneous since both are controlled by the same cam and rotative pin. Hence, in the operation of the parts 125 and 131a it will be apparent that as the shutter 125 opens to drop a pin the pusher rod 131a moves inwardly to push a pin previously dropped into the dial.

From the pin feeding station the dial carries a feed pin to the next station whereat a vertical plunger carried at the end of a lever 135 is moved downwardly into a recess 71 under the influence of cam 59 which engages the opposite end of lever 135 to insure proper seating of the valve pin within the dial recess.

*Swiveled plug and valve seat feeding means.*—The valve pins within the recesses in the dial, after reaching the station whereat they are properly seated within the dial recesses, are moved to the swiveled plug and valve seat station whereat a previously swivelly-assembled screw plug 34 and valve seat member 35 are mounted upon the valve pin 30 above the valve plunger 31 thereon.

The swiveled plug and valve seat may be fed to the recesses 71 in the dial in any preferred manner. As herein shown, they are fed from an oscillatory hopper 140 down an inclined raceway 141 to a feed interrupter means 142 at the lower end of said raceway, from which interrupter means the swiveled plug and seat members are released singly in timed relation to the recesses 71 in the dial in timed relation to the movement of said dial to present said recesses at said station.

The feed hopper may be of any preferred construction adapted to feed headed members to a raceway, and as herein shown consists of a substantially rectangular receptacle having a raceway 140a extending centrally thereof, said raceway comprising a straight track portion 140b and a tubular portion 140c, the track in said tubular portion being deflected or disposed at an angle to the median plane of the raceway so as to provide an intermediate part 140d disposed substantially at a right angle to the track portion 140b and raceway 141. The bottom of the hopper 140 is formed with inclined bottom portions 140e and 140e' at its rear and forward portions respectively, and has mounted thereon a pyramid-like projection 140f which serves as a deflector for the parts within the hopper as the latter is oscillated. A cover member 140g may be disposed over the top of the rear portion of the hopper to prevent throwing out of the parts as the hopper is oscillated. Disposed within the track 140b at the rear of the hopper is a plate 140h which normally has its top surface disposed below the top of the track so as not to interfere with the reception and guiding of members to be fed therein, said plate 140h being pivoted between the walls of said track and being held in its lowermost position therein through the medium of a compression spring 140j of said plate and a pin 140k carried by a slidable pin 140l which extends through a projection on the underside of the hopper, the top of said pin 140l being adapted to engage the underside of the plate 140h to move the same upwardly within the track when the lower end of the pin 140l strikes against the resilient projection 143a mounted on the crank pin 143 as the hopper is oscillated by said crank pin.

The hopper 140 is provided on its opposite sides intermediate its ends with trunnions 144 into which seat the tapered ends of set screws 145 mounted in brackets 146 and 146a supported on the table of the machine 40. The hopper is oscillated about its pivot point in the trunnions 144 in the following manner: The pinion 46b mounted on shaft 46 is in mesh with gear 49 mounted on shaft 48. Secured to the hub of said gear 49 through the medium of bolts 49a is a heart wheel 66, the peripheral surface of which is provided with teeth 66a. A crank 143 is enlarged at its lower portion and formed with an elongated slot 143b which straddles a guide block 143c mounted on the shaft 48. Intermediate its ends the crank carries a roller 143d which is held in contact with the peripheral surface of the heart wheel 66a by a tension spring 148 which is anchored at one end to the lower end of the crank, and at its other end to the machine frame. For adjusting the effective length of the crank it is formed of two parts adjustably connected together through the medium of a union or turnbuckle 143e. The end of the crank opposite that to which the spring 148 is anchored is pivotally connected to a depending lug on the underside of the hopper 140, as shown at 143f. It will thus be seen that as the gear 49 is rotated by pinion 46b, heart wheel 66 will also be rotated, and in its rotation will move the roller 143d eccentrically to oscillate the hopper 140 in a vertical direction.

Figure 15:
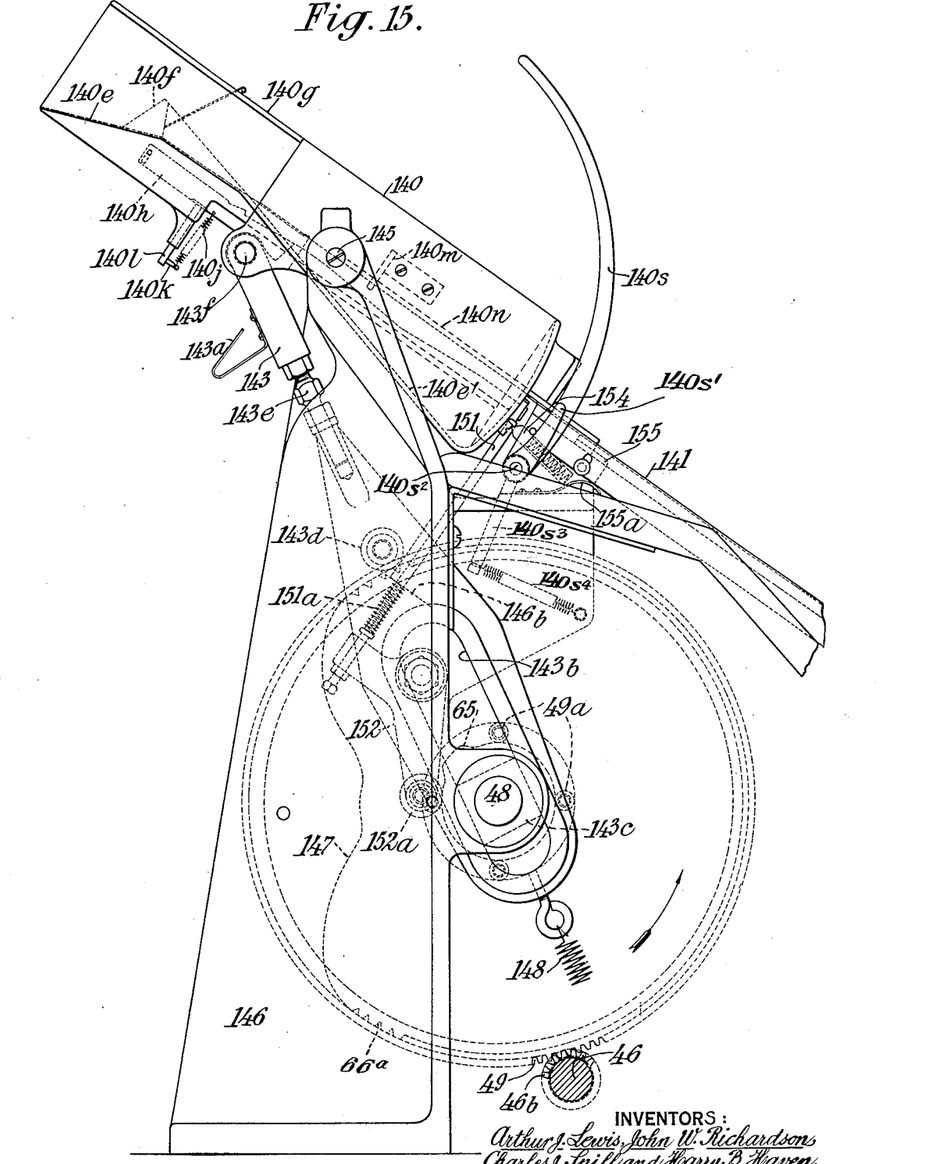
Fig. 15 is a side elevation of a feed hopper and its operating mechanism by means of which the valve plug and valve seat units are fed.
Figure 16:
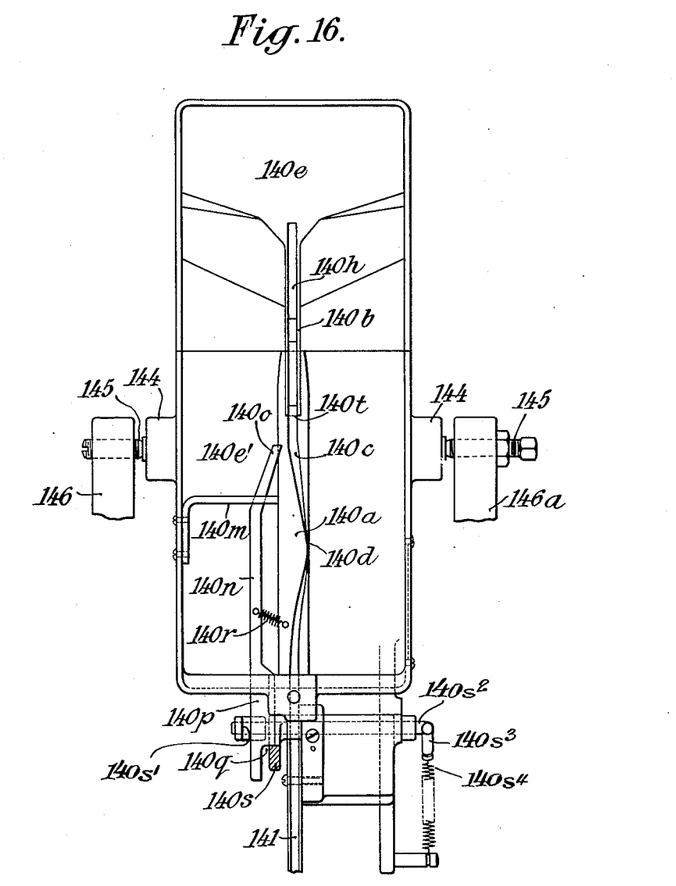
Figs. 16 and 17 are a top plan and an end elevation respectively of the feed hopper shown in Fig. 15.
Figure 17:
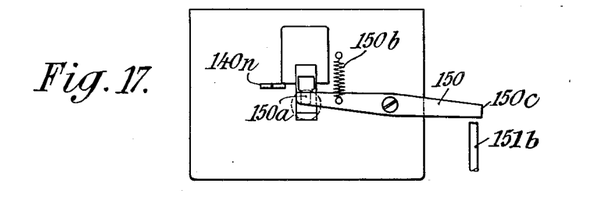
Figures 18, 19:
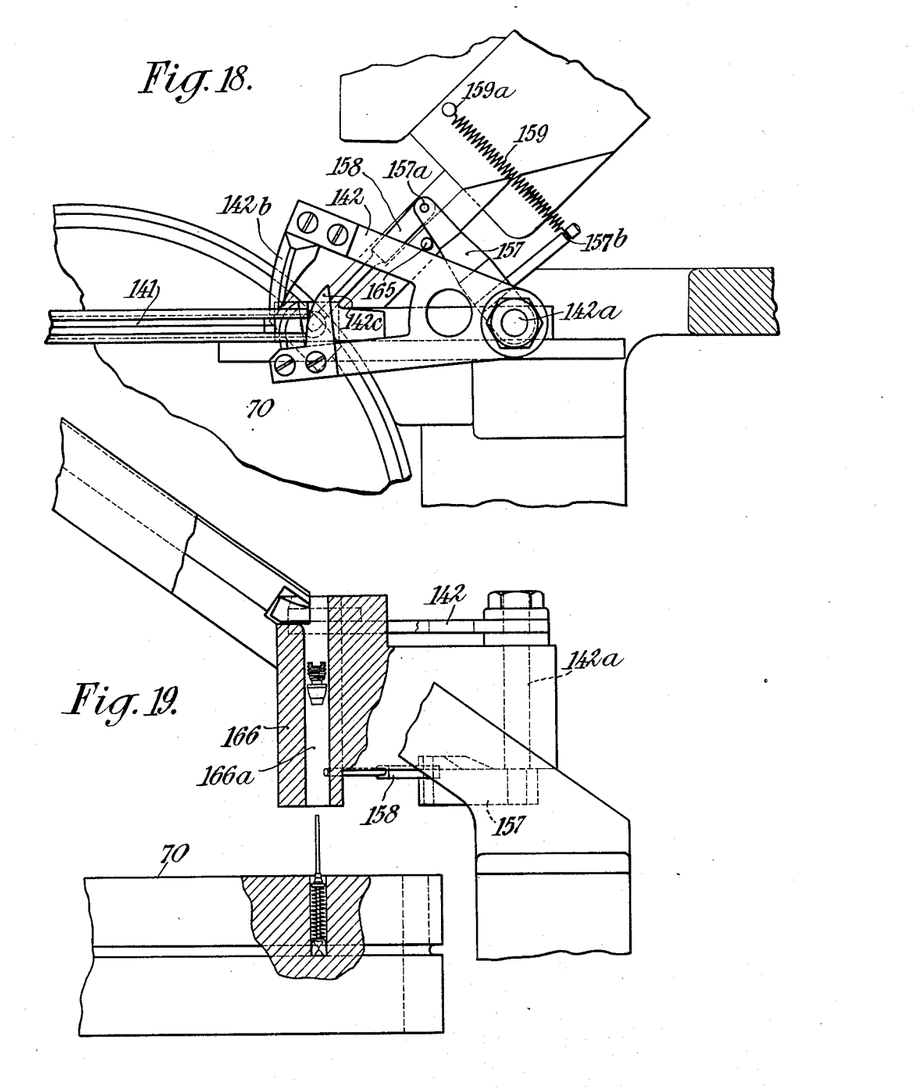
Fig. 18 is a top plan view of the interrupter means at the lower end of the raceway leading from the feed hopper shown in Fig. 15.
Fig. 19 is a side elevation partly in section of the means shown in Fig. 18.

Mounted on the inner wall of the hopper 140 is an angular bracket 140m having a slot therein through which an arm or lever 140n extends, one end 140o of said arm being inwardly deflected toward the track, and the other end 140p extending through the front wall of the hopper and terminating in an angular portion 140q. A tension spring 140r normally draws the arm toward the end of the slot nearest the middle of the hopper. Mounted in front of the hopper is an arcuate rail 140s which abuts against the shoulder in the angular portion 140q of the member 140n, and a cam 140s' engages the outer face of said arm. As the hopper 140 is oscillated, the shoulder in the portion 140q rides against the arcuate rail, which functions to move the arm 140n inwardly as the hopper moves to non-feeding position, which inward movement causes the end 140o to engage across the track 140c to close the same at the end 140t at the forward end of the straight track portion 140b to prevent the parts held in the portion of the track 140c from being released back into the hopper. This arm control accordingly functions to insure a supply of parts within the track portion 140c for delivery to the raceway 141 when the hopper again assumes its inclined position shown in Fig. 15. As the hopper assumes this position, the cam 140s' moves the arm 140n to the left, in Fig. 16, against the tension of spring 140r to open the supply of parts from 140b to 140c. The arcuate rail 140s and the cam 140s' are mounted fast upon a pintle 140s² which has a downwardly-bent portion 140s³, to which is anchored a tension spring 140s⁴ which functions to permit slight rotation or movement of the rail 140s for clearance purposes as the hopper is oscillated. For preventing discharge of the parts from the track 140a as it moves into the position shown in Fig. 15, the opening in the front wall of the hopper is normally closed by a gate 150a formed at one end of a pivoted lever 150, the gate end of said lever being normally closed by the action of a tension spring 150b. The spring 150b normally holds the gate 150a in closed position until it is physically opened by engagement against the end 151b of the control rod 151, which control rod is carried by a bell-crank lever 152 supported in the bracket 146, one end of said bell-crank lever carrying a roller 152a which is normally pressed into engagement with the surface of cam 65 by a coil spring 151a mounted upon the rod 151 and which presses against an abutment 146b on the bracket member 146. For holding the gate in open position, a spring-pressed latch 154 engages the control rod 151 when it is in open gate position. If in the feeding of the plugs from the hopper 140 to the raceway 141 a plug should become caught at the upper end of the raceway, there is mounted within the raceway between the walls thereof a plate 155 which is urged upwardly into its normal position by a flat leaf spring 155a, said plate being adapted to yield under strain and thus permit the plug to pass down the raceway.

At the lower end of the raceway 141 the interrupter means 142 control the feeding of the plugs to the recesses in the dial. Said interrupter means 142 consists of a member which is mounted upon a stud 142a to be rotatable or oscillatable therewith, the lower end of said stud having connected therewith a bell-crank lever 157, one end 157a of said lever carrying a control rod 158 and the end 157b of the second arm of the lever 157 having attached thereto a tension spring 159, the opposite end of which is anchored to a pin 159a secured to the machine frame. The member 142 has a pair of arms which diverge from the point of mounting 142a and carry at their free ends oppositely-directed jaws 142b and 142c adapted to alternately move transversely across the raceway 141, said jaws being spaced apart in a radial direction, a distance slightly greater than the diameter of a plug member which is fed down the raceway. The alternate movement of the jaws 142b and 142c across the raceway, it will be appreciated, will control the release of the plugs from the end of the raceway singly in timed relation with said movements of the jaws.

Figure 21:
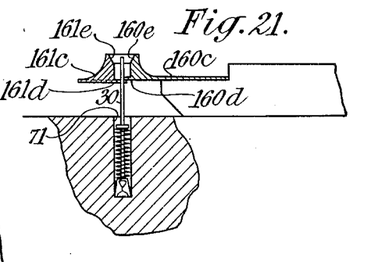
Figure 23:
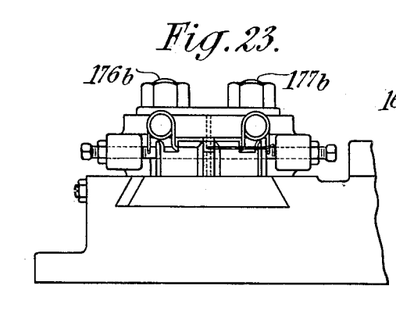
Fig. 23 is a side elevation of the pin swaging means shown in Fig. 22.

The timed movement of the jaws of the interrupter is controlled by the movement of the lever 157, which, in turn, is controlled by the movement of the pin-centering means at the plug feeding station. These centering means consist of a pair of slide members 160 and 161 which are oppositely movable in a slide block 162 carried by the machine, the rear ends of said slide members each carrying an angular bracket 160a and 161a, respectively, the free ends of said brackets having elongated slots into which extend pins 160b and 161b, respectively, said pins being mounted upon a double bell-crank lever 163 which is pivoted at 163a, the free end of the long arm of said bell-crank lever being provided with a roller 163b which is held in contact with the surface of cam 60 through the medium of a tension spring 164, one end of said spring being anchored to the pin 160b and the other end being anchored to the guide block 162. At the forward end of the slide members 160 and 161 they are fitted with jaw members 160c and 161c, respectively, the end of jaw member 161c being angularly disposed so as to bring its jaw into alignment with the line of movement of the jaw 160c. As seen from Figs. 20 and 21, said jaw members each comprise two elements, namely, a flat base element 160d and 161d, respectively, each provided with a cooperating V or angular detent for engaging and centering the pin 30 within a recess in the dial, and a countersunk portion 160e and 161e, respectively, at its upper face, which, in cooperative relation, provide a funnel-like guide for centering and guiding a fed, swiveled plug and valve seat member 34, 35 upon said pin 30. Mounted upon the slide member 160 rearwardly of the jaw is a vertical pin or abutment 165, which, as the slide member moves rearwardly, is adapted to engage the lever 157 to move the same about its pivotal axis. The movement of the lever 157, it will be apparent, will rotate the pin 142a and with it the jaws 142b and 142c of the interrupter. As the slide member 160 moves forwardly the spring 159 will move the lever 157 in the same direction. Synchronous with the movements of the slide members, the lever 157 and the interrupter jaws, is the movement of the rod 158 which is carried by the lever 157. The free end of said rod 158 is movable through an opening in the guide block 166, through which a vertical opening 166a extends leading from the discharge end of the raceway 141 and being in aligned relation to a recess in the dial at the plug feeding station. When the free end of the rod 158 extends into the opening 166a it provides a seat or gate upon which a fed plug is held before its release to a valve pin.

From the foregoing description of the mechanism at the plug feeding station it will be seen that as the slide members 160 and 160a are alternately reciprocated through the medium of bell-crank lever 163, plugs coming down the raceway 141 are released in timed relation to the opening 166a to be received upon the member 158, and then subsequently released by the member 158 to be guided by the centering means 160c and 161c upon the valve pin.

*Pin swaging station.*—From the plug applying station the dial conveys a valve pin with a plug in position thereon to the pin swaging station, whereat a pair of swaging dies are caused to operate upon the top of the pin to enlarge the same and thereby hold the plug in non-removable assembled relation upon the valve pin. A pin in the dial as it approaches the swaging station is guided by a block 170 mounted on a bracket 171, which, in turn, is carried by a block 172 mounted in superposed relation to the dial, said guide member 170 also acting as a means for centering the pin at said swaging station. As the dial comes to rest, a pair of swaging dies 173, 174 carried by a supporting unit 175 mounted between the ends 176a and 177a of a pair of levers 176 and 177, respectively, which are pivotally mounted at 176b and 177b, respectively, and which have at their opposite ends rollers 176b and 177b, respectively, held against the surfaces of cams 62 and 61, respectively, by a tension spring 178, are adapted to move toward each other when said rollers ride over the high on said cams to swage the end of the pin.

From the pin swaging station the assembled units upon the further rotation of the dial engage a curved deflector or kick-off 180 which functions to discharge the assembled units from the dial.

From the detailed descriptions of the various subordinate mechanisms and their manners of operation, as well as their correlation with the intermittent dial feed of the valve pins to the various operating stations, it will be apparent that we have provided a machine which in a wholly automatic manner feeds units consisting of a valve pin having mounted thereon a valve plunger, a spring and a spring support, and units consisting of a screw plug which swivelly supports a valve seat member and assembles said units together to provide a complete valve inside.

The specific instrumentalities disclosed herein, it is to be understood, are only shown by way of example and are not to be construed as limitations upon the invention. Accordingly, other instrumentalities in the same or modified combinations may be substituted for those herein disclosed without departing from the spirit of the invention.

What we claim is:

1. A machine of the character described, comprising an intermittently movable conveyor for successively presenting valve pins or the like to a station, means for presenting a valve seat member above a pin at said station and releasing said seat member so that it will drop over the pin by the action of gravity on said seat member, and means at said station for aligning the pin and the valve seat to insure the positioning of the latter over the former.

2. A machine of the character described, comprising an intermittently movable conveyor for successively presenting valve pins or the like to a station, means for presenting a valve seat member above a pin at said station and releasing said seat member so that it will drop over the pin by the action of gravity on said seat member, and means at said station for engaging the pin and for guiding the valve seat member over said pin as said seat member moves downwardly.

3. An assembling machine of the character described, comprising a conveyor having a plurality of spaced recesses, said conveyor being intermittently movable to present the recesses successively to different stations, means at one station for feeding a valve pin to each recess as it reaches said station, and means at a subsequent station for feeding and applying a valve seat member upon a pin as it reaches said station.

4. An assembling machine of the character described, comprising a conveyor having a plurality of spaced recesses, said conveyor being intermittently movable to present the recesses successively to different stations, means at one station for feeding a valve pin to each recess as it reaches said station, means at a subsequent station for feeding and applying a valve seat member upon a pin as it reaches said station, and means at a subsequent station for swaging the upper end of the pin.

5. An assembling machine of the character described, comprising a conveyor having a plurality of spaced recesses, said conveyor being intermittently movable to present the recesses successively to different stations, means at one station for feeding a valve pin having a plunger mounted thereon to each recess as it reaches said station, means at a subsequent station for feeding and applying a valve seat member upon a pin above the plunger as said recess reaches said station, and means at a subsequent station for operating upon said assembled parts to prevent their separation, the various means being intermittently time-controlled.

6. A machine of the character described, comprising an intermittently movable conveyor having spaced apart recesses for receiving pins, means for successively presenting said recesses to a station, and means at said station for centering a pin within a recess, said last named means comprising a pair of members provided at one set of adjacent ends with cooperating jaws for engaging a pin, and means for moving said members to operate said jaws.

7. A machine of the character described, comprising an intermittently movable conveyor having spaced apart recesses for receiving pins, means for successively presenting said recesses to a station, and means at said station for centering a pin within a recess, said last named means comprising a pair of oppositely-reciprocable slide members provided at one set of adjacent ends with cooperating jaws for engaging a pin, and connected at their opposite ends to the means for reciprocating said members.

8. A feed hopper for pins or the like, comprising a substantially tubular housing, a hollow helical conveyor rotatably mounted within the housing with the outer peripheral edge of the helix in close proximity to the wall of the housing, a pin receptacle into which the conveyor and housing extend, and a raceway to which the pins are delivered by the conveyor, the housing having an opening where it extends into the pin receptacle and an opening leading to the raceway.

9. A feed hopper for pins or the like, comprising a substantially tubular housing, a hollow helical conveyor rotatably mounted within the housing with the outer peripheral edge of the helix in close proximity to the wall of the housing, said housing and helix being inclined with respect to the horizontal, a pin receptacle near the lower end of the housing into which the conveyor and housing extend, and a raceway near the upper end of the housing to which the pins are delivered by the conveyor, the housing having an opening where it extends into the pin receptacle and an opening leading to the raceway.

10. A pin or the like conveyor, comprising a raceway, means for delivering pins to said raceway, and kick-off means cooperating with said raceway for preventing the choking thereof, said kick-off means comprising a toothed wheel rotatably and yieldably mounted in proximity to the raceway.

11. A pin or the like conveyor, comprising a raceway and a traveling belt for supporting the pins in said raceway, said belt comprising a closely coiled helical spring.

12. A pin or the like conveyor, comprising a raceway, a traveling belt in said raceway for supporting the pins, and a reciprocable member adapted on its forward stroke to engage and cause said pins to move within the raceway.

13. A conveyor for valve pins or the like having an encircling spring thereon, comprising a flexible carrier for said pins and means for engaging said pins and causing them to move with said carrier.

14. A conveyor for valve pins or the like having an encircling spring thereon, comprising a traveling flexible carrier upon which the pins are supported with their springs in contact with said carrier, and a reciprocable member for causing said pins to move with said carrier.

15. A conveyor for valve pins or the like having an encircling spring thereon, comprising a closely coiled helical spring belt upon which the pins are adapted to be supported with their springs in contact with the spring belt, and means for clamping the pins against said belt so as to be carried thereby as the belt is moved.

16. A pin or the like feeding means, comprising a raceway, a member mounted in superposed relation to said raceway and reciprocable with respect thereto, means for urging said member into contact with the fed pins in the raceway on the forward stroke of the member, and means for holding said member out of contact with the fed pins on the backward stroke of said member.

17. A pin or the like feeding means, comprising a raceway, a member mounted in superposed relation to said raceway and reciprocable with respect thereto, means for urging said member into contact with the fed pins in the raceway on the forward stroke of the member, and means for holding said member out of contact with the fed pins on the backward stroke of said member, the reciprocable member being resiliently mounted upon its supporting member.

18. A pin or the like feeding means, comprising a raceway, a traveling belt for supporting pins in said raceway, a member mounted in superposed relation to said belt and reciprocable with respect thereto, means for urging said member into contact with the fed pins in the raceway on the forward stroke of the member, and means for holding said member out of contact with the fed pins on the backward stroke of said member, the reciprocable member being resiliently mounted upon its supporting member and having its edge which contacts with the pins of serpentine form.

19. A pin or the like feeding means, comprising a raceway and an interrupter for releasing the pins singly in timed relation, said interrupter comprising a pair of spaced pins disposed transversely to the raceway and alternately movable across the raceway, said pins being resiliently mounted for independent movement in an axial direction.

20. A pin or the like feeding means, comprising a raceway, a traveling belt in said raceway for carrying the pins down said raceway, an interrupter for releasing the pins down the raceway singly in timed relation, and means for positively moving a pin down the raceway independently of its movement by the traveling belt when the interrupter is in pin releasing position.

21. A pin or the like feeding means, comprising a raceway, an interrupter for releasing the pins down the raceway singly in timed relation, said interrupter comprising a pair of spaced apart stop elements which are alternately movable across the raceway, and means for positively moving a pin down the raceway when the interrupter is in pin releasing position, said means being operable upon the pins between the spaced stop elements of the interrupter.

22. A pin or the like feeding means, comprising a raceway, an interrupter for releasing the pins down the raceway singly in timed relation, and a reciprocable member for positively moving a pin down the raceway when the interrupter is in pin releasing position, said reciprocable member being adapted on its forward stroke to engage and move a pin along the raceway.

23. A device of the character described, comprising an intermittently movable conveyor having recesses within which pins are adapted to be received, and means for feeding pins to said recesses singly in timed relation, said means comprising a raceway to which pins are supplied, interrupter means for releasing the pins singly in timed relation, a shutter upon which a released pin is received, and means for moving the shutter to deliver the pin to the recess in the conveyor, the movement of said various parts being time-controlled.

24. A device of the character described, comprising an intermittently rotatable dial having radial peripheral recesses within which pins are adapted to be received, and means for feeding pins to said recesses singly in timed relation, said means comprising a raceway to which pins are supplied, interrupter means for releasing the pins singly in timed relation, a shutter upon which a released pin is received, means for moving the shutter to deliver the pin to a recess in upright position, and a radially movable pusher rod for pushing said pin into a dial recess, the movement of said various parts being time-controlled.

25. A feed hopper for members having an annular groove, comprising a pair of spaced rails for engaging the groove in the members and upon which rails said members can seat and slide, said rails having a portion in which the members seat in upright position and a portion in which the members seat in a position at an angle to upright.

26. A feed hopper for members having an annular groove comprising a pair of spaced rails for engaging the groove in the members and upon which rails said members can seat and slide, said rails having a portion in which the members seat in upright position and a portion in which the members seat in a substantially horizontal position, said portions of the rails being joined together to provide a continuous track.

27. A feed hopper for members having an annular groove, comprising a pair of spaced rails providing a continuous track for engaging the groove in the members and upon which said members can seat and slide, said track having portions in which the members seat in upright position and an intermediate portion in which the members seat in a position at an angle to the upright.

28. An oscillatable feed hopper for headed members or the like, comprising a track in which the members can seat and slide, and resiliently mounted means engaging in a portion of the track within the hopper to clear the same of members at each downward movement of the hopper.

29. A machine of the character described, comprising a conveyor for intermittently presenting valve pins or the like to a station, a raceway in proximity to said station down which valve seat members are fed, interrupter means at the lower end of said raceway for releasing the valve seat members singly in timed relation, means for receiving a released valve seat member and presenting it in superposed relation to a valve pin at said station, and means for releasing said valve seat member so that it will drop over the pin by the action of gravity.

30. A machine of the character described, comprising a conveyor for intermittently presenting valve pins or the like to a station, a raceway in proximity to said station down which valve seat members are fed, interrupter means at the lower end of said raceway for releasing the valve seat members singly in timed relation, means for receiving a released valve seat member and presenting it in superposed relation to a valve pin at said station, and means at said station for centering the pin and guiding the valve seat member over said pin as said seat member moves downwardly, said interrupter means being operable through the movement of the pin centering means.

ARTHUR J. LEWIS.
JOHN W. RICHARDSON.
CHARLES J. SPILL.
HARRY B. HAVEN.